(12) United States Patent
Ryu et al.

(10) Patent No.: US 9,850,826 B2
(45) Date of Patent: Dec. 26, 2017

(54) ASYMMETRY CDA ENGINE

(71) Applicant: Hyundai Motor Company, Seoul (KR)

(72) Inventors: In Sang Ryu, Incheon (KR); Ingee Suh, Yongin-si (KR); Kyoung Pyo Ha, Seongnam-si (KR); Back Sik Kim, Osan-si (KR); Kiyoung Kwon, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 143 days.

(21) Appl. No.: 14/858,968

(22) Filed: Sep. 18, 2015

(65) Prior Publication Data

US 2016/0108826 A1   Apr. 21, 2016

(30) Foreign Application Priority Data

Oct. 21, 2014   (KR) ........................ 10-2014-0142795

(51) Int. Cl.
*F02D 17/02* (2006.01)
*F02D 13/06* (2006.01)
*F02D 41/00* (2006.01)
*F01L 13/00* (2006.01)
(Continued)

(52) U.S. Cl.
CPC ............. *F02D 17/02* (2013.01); *F02D 13/06* (2013.01); *F01L 13/0005* (2013.01); *F01L 2013/001* (2013.01); *F02D 35/028* (2013.01); *F02D 41/0087* (2013.01); *F02D 41/38* (2013.01); *F02D 2041/0012* (2013.01); *Y02T 10/18* (2013.01)

(58) Field of Classification Search
CPC ............. F02D 13/06; F02D 2041/0012; F01L 2013/001

USPC ............................................... 123/198 F, 481
See application file for complete search history.

(56) References Cited

U.S. PATENT DOCUMENTS 3,581,628 A * 6/1971 Williams ................ F16F 15/24
                                                      123/192.2
5,261,236 A * 11/1993 Ironside .............. F02D 41/0007
                                                      123/399
(Continued)

FOREIGN PATENT DOCUMENTS

JP         3556333 B2     5/2004
JP       2005-48729 A     2/2005
(Continued)

OTHER PUBLICATIONS

Yamaha Motor Company, 2009 R1: Engine with uneven firing order, Nov. 19, 2008, https://www.yamaha-motor.eu/designcafe/en/about-bikes/supersport/index.aspx?view=article&id=442652&segment=Supersport&archive=false&page=1.*

*Primary Examiner* — Sizo Vilakazi
*Assistant Examiner* — Kevin R Steckbauer
(74) *Attorney, Agent, or Firm* — Morgan, Lewis & Bockius LLP

(57) ABSTRACT

An asymmetry cylinder de-activation (CDA) engine provided with a first, a second, a third and a fourth cylinder of which CDA apparatuses are mounted thereto respectively may include a crankshaft connected with pistons of each cylinder through a first, a second, a third and a fourth cranking journal respectively, and a controller configured to control operations of the CDA apparatuses, in which phase differences between cranking journals according to firing order may include 90±10 degrees and 270±10 degrees.

16 Claims, 9 Drawing Sheets

(51) Int. Cl.
    *F02D 41/38*     (2006.01)
    *F02D 35/02*     (2006.01)

(56) References Cited

U.S. PATENT DOCUMENTS

| | | | |
|---|---|---|---|
| 7,063,059 B2* | 6/2006 | Calderwood | F02D 13/0215 |
| | | | 123/146.5 A |
| 9,249,749 B2* | 2/2016 | Brennan | F02D 41/021 |
| 9,328,647 B2* | 5/2016 | Koyanagi | F01N 13/10 |
| 2006/0102124 A1* | 5/2006 | Calderwood | F02D 13/0215 |
| | | | 123/146.5 A |
| 2010/0294222 A1 | 11/2010 | Methley | |
| 2012/0204832 A1 | 8/2012 | Baur et al. | |
| 2012/0221217 A1 | 8/2012 | Sujan et al. | |
| 2013/0146008 A1 | 6/2013 | Stoody | |
| 2013/0255626 A1 | 10/2013 | Serrano | |
| 2013/0317725 A1 | 11/2013 | Brennan | |
| 2014/0053804 A1 | 2/2014 | Rayl et al. | |
| 2014/0102411 A1* | 4/2014 | Brennan | F02D 41/021 |
| | | | 123/350 |
| 2014/0290232 A1* | 10/2014 | Koyanagi | F01N 13/10 |
| | | | 60/323 |
| 2016/0333801 A1* | 11/2016 | Tsukahara | F02D 9/02 |

FOREIGN PATENT DOCUMENTS

| | | |
|---|---|---|
| JP | 2007-224743 A | 9/2007 |
| JP | 2009-250220 A | 10/2009 |
| JP | 2010-127074 A | 6/2010 |

\* cited by examiner

ASYMMETRY CDA ENGINE

CROSS-REFERENCE TO RELATED APPLICATION

The present application claims priority to Korean Patent Application No. 10-2014-0142795 filed Oct. 21, 2014, the entire contents of which is incorporated herein for all purposes by this reference.

BACKGROUND OF THE INVENTION

Field of the Invention

The present invention relates to an asymmetry CDA engine. More particularly, the present invention relates to an asymmetry CDA engine which may change deactivated cylinders according to operation states of a vehicle.

Description of Related Art

An internal combustion engine receives fuel and air into a combustion chamber and burns the same to generate power. When taking in air, an intake valve is operated by driving of a camshaft, and while the intake valve is open, air is taken into the combustion chamber. Also, an exhaust valve is operated by driving of the camshaft, and while the exhaust valve is open, air is discharged from the combustion chamber.

A cylinder de-activation (CDA) apparatus is applied to an engine for deactivating operations of a part of combustion chambers in low load conditions or in idle condition so as to reduce fuel consumption.

However, a cylinder of which the CDA apparatus is operated may be over cooled and thus operation time of the CDA apparatus may be limited.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing an asymmetry CDA engine which may change deactivated cylinders according to operation states of a vehicle.

An asymmetry cylinder de-activation (CDA) engine provided with a first, a second, a third and a fourth cylinder of which CDA apparatuses are mounted thereto respectively may include a crankshaft connected with pistons of each cylinder through a first, a second, a third and a fourth cranking journal respectively, and a controller configured to control operations of the CDA apparatuses, in which phase differences between cranking journals according to firing order include 90±10 degrees and 270±10 degrees.

The firing order of the engine may be the first, the third, the fourth and the second cylinder sequentially, and phase differences between the first cranking journal and the third cranking journal, between the third cranking journal and the fourth cranking journal, between the fourth cranking journal and the second cranking journal and between the second cranking journal and the first cranking journal may be 270±10 degrees, 180±10 degrees, 90±10 degrees and 180±10 degrees.

The firing order of the engine may be the first, the third, the fourth and the second cylinder sequentially, and phase differences between the first cranking journal and the third cranking journal, between the third cranking journal and the fourth cranking journal, between the fourth cranking journal and the second cranking journal and between the second cranking journal and the first cranking journal may be 180±10 degrees, 270±10 degrees, 180±10 degrees and 90±10 degrees.

The controller may be configured to operate at least one CDA apparatus according to a load of the engine.

The controller may be configured to operate at least one CDA apparatus and at least one of remaining CDA apparatuses by turns according to a load of the engine.

The controller may be configured to operate two CDA apparatuses by turns according to a load of the engine.

The controller may be configured to operate one CDA apparatus and operate remaining CDA apparatuses additionally according to a load of the engine.

The controller may be configured to control a fuel injection amount into a cylinder of which the CDA apparatus is not operated in accordance with a predetermined map when one or more CDA apparatuses are operated.

Phase differences of each cam may be asymmetrical.

The engine may be provided with a turbocharger.

The engine may further include an injector which directly injects fuel into each cylinder.

According to various aspects of the present invention, an asymmetry CDA engine provided with a plurality of CDA apparatuses may include a crankshaft connected with pistons of each cylinder through cranking journals respectively, and a controller configured to control operations of the CDA apparatuses, in which a minimum phase difference between cranking journals according to firing order is less than ½ of a maximum phase difference between cranking journals.

The controller may be configured to operate at least one CDA apparatus according to load of the engine, and the controller may be configured to operate remaining CDA apparatuses according to a predetermined operation condition.

According to various embodiments of the present invention, the asymmetry CDA engine may change deactivated cylinders according to operation states of a vehicle.

Since the asymmetry CDA engine according to various embodiments of the present invention may change deactivated cylinder, so various CDA modes may be performed.

It is understood that the term "vehicle" or "vehicular" or other similar terms as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuel derived from resources other than petroleum). As referred to herein, a hybrid vehicle is a vehicle that has two or more sources of power, for example, both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 1:
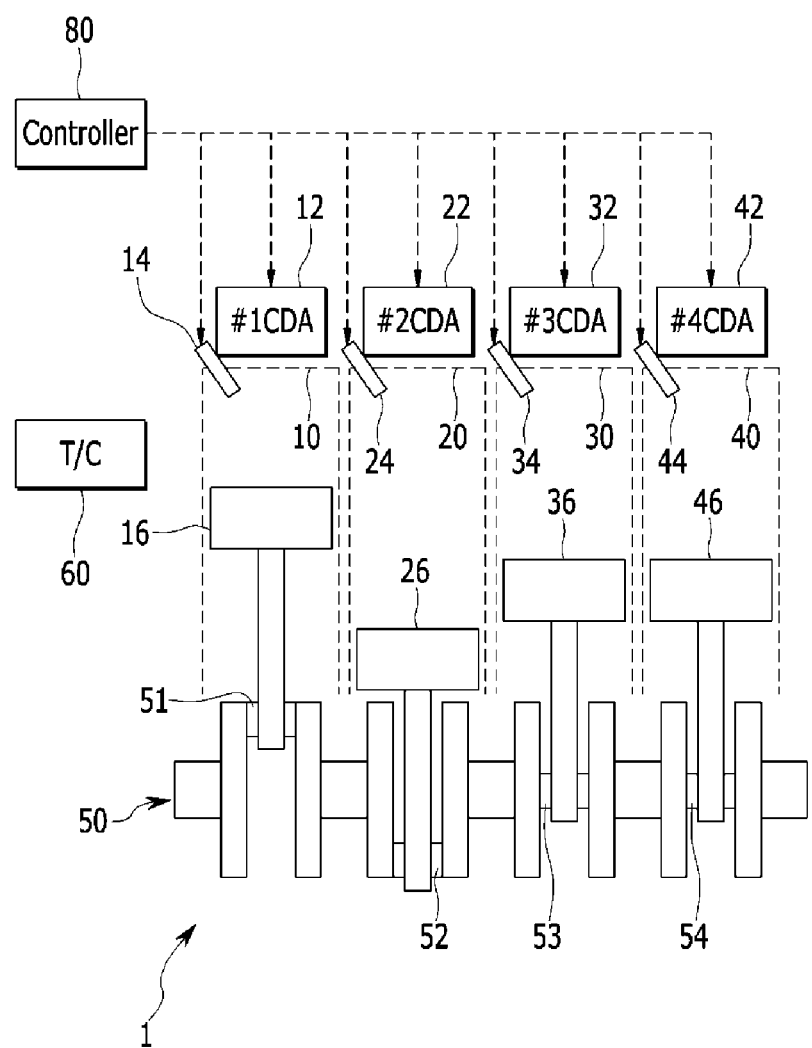
FIG. 1 is a drawing showing an exemplary asymmetry cylinder de-activation (CDA) engine according to the present invention.
Figure 2:
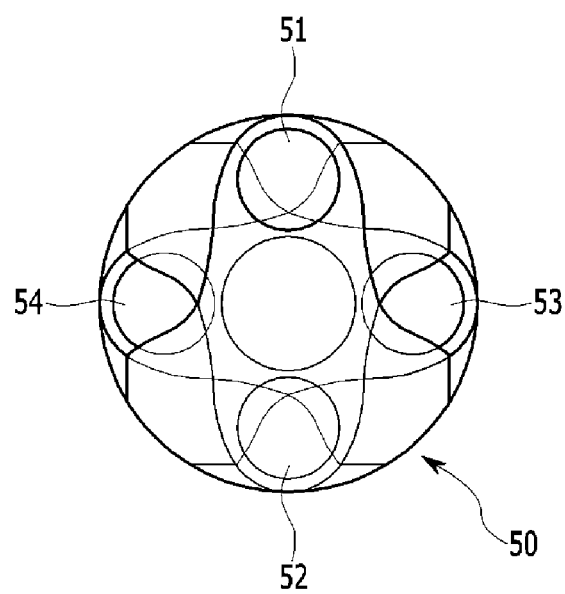
FIG. 2 is a drawing showing a crankshaft applied to an exemplary asymmetry CDA engine according to the present invention.
Figure 3:
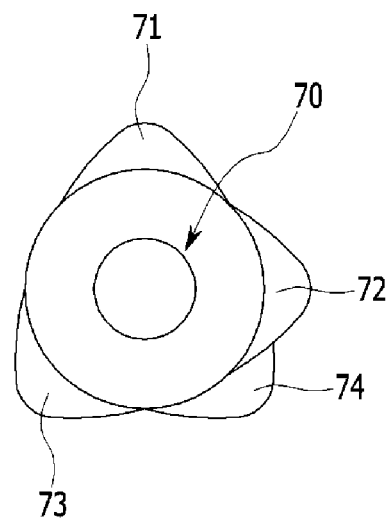
FIG. 3 is a drawing showing a cam applied to an exemplary asymmetry CDA engine according to the present invention.

FIG. 1 is a drawing showing an asymmetry cylinder de-activation (CDA) engine according to various embodiments of the present invention, FIG. 2 is a drawing showing a crankshaft applied to an asymmetry CDA engine according to various embodiments of the present invention and FIG. 3 is a drawing showing a cam applied to an asymmetry CDA engine according to various embodiments of the present invention.

Referring to FIG. 1 to FIG. 3, an asymmetry CDA engine 1 according to various embodiments of the present invention may be an engine including a first, a second, a third and a fourth cylinder 10, 20, 30 and 40 where a plurality of CDA apparatuses 12, 22, 32 and 42 are provided thereto respectively.

The asymmetry CDA engine 1 includes a first, a second, a third and a fourth cylinder piston 16, 26, 36 and 46 disposed to the first, the second, the third and the fourth cylinder 10, 20, 30 and 40 respectively.

The asymmetry CDA engine 1 further includes a crankshaft 50 connected with the first, the second, the third and the fourth cylinder piston 16, 26, 36 and 46 through a first, a second, a third and a fourth cranking journal 51, 52, 53 and 54 respectively, and a controller 80 controlling operations of the CDA apparatuses 12, 22, 32 and 42.

Firing order of the engine 1 of various embodiments of the present invention may be the first, the third, the fourth and the second cylinder 10, 30, 40 and 20 sequentially.

In a general engine provided with CDA apparatuses, phase differences between neighbor pistons are constant, for example, about 180 degrees. And generally, CDA apparatuses are configured to control flowing of air or air-fuel mixture into or from a second cylinder and a third cylinder. And the CDA apparatuses mounted to the second cylinder and the third cylinder are deactivated in low load condition.

However, since the deactivated cylinder may be overcooled, thus exhaust gas may be deteriorated. And sectional temperature differences of the engine may reduce operation time in CDA mode.

Since the general engine may be operated only in 2 modes, for example a mode of which two cylinders are deactivated and a mode of which 4 cylinders are normally operated, thus improvement of fuel consumption may be limited.

In various embodiments, phase differences between the cranking journals 51, 52, 53 and 54 according to firing order include 90±10 degrees and 270±10 degrees.

The phase differences between the first cranking journal 51 and the third cranking journal 53, between the third cranking journal 53 and the fourth cranking journal 54, between the fourth cranking journal 54 and the second cranking journal 52 and between the second cranking journal 52 and the first cranking journal 51 are 270±10 degrees, 180±10 degrees, 90±10 degrees and 180±10 degrees respectively.

In the general engine provided with CDA apparatuses, phase differences between neighbor pistons are constant for example, about 180 degrees. However, in various embodiments, phase differences between the cranking journals in the firing order are not constant.

The controller 80 may operate at least one CDA apparatus according to load of the engine 1, and operate at least one CDA apparatus and at least one of the other CDA apparatuses by turns according to load of the engine 1.

The controller 80 may operate two CDA apparatuses by turns according to load of the engine 1 and operate one CDA apparatus and operate other CDA apparatus additionally according to load of the engine 1.

As shown in FIG. 3, phase differences of each cam 71, 72, 73 and 74 are asymmetrical.

That is, the first, the second, the third and the fourth cam 71, 72, 73 and 74 applied to the first, the second, the third and the fourth cylinder 10, 20, 30 and 40 are asymmetrically mounted to a camshaft 70 corresponding to positions of the first, the second, the third and the fourth piston 16, 26, 36 and 46.

As shown in FIG. 1, the engine 1 may be provided with a turbocharger 60, and thus fuel-efficiency as well as of output may be improved with the operations of the CDA apparatuses 12, 22, 32 and 42 and the turbocharger 60.

Also, injectors 14, 24, 34 and 44 directly injecting fuel into each cylinder 10, 20, 30 and 40 may be provided to the engine 1 for improve output.

In various embodiments, since the turbocharger 60 and/or the direct injectors 14, 24, 34 and 44 may be applied, thus size of the engine may be reduced and fuel consumption may be improved.

The controller 80 may control fuel injection amount into a cylinder of which the CDA apparatus is not operated in accordance with a predetermined map when one or more CDA apparatuses 12, 22, 32 and 42 are operated. That is, if fuel injection amount is controlled according to combust timing interval among present operated cylinders, vibration characteristic may be improved even though combust timing is non-uniform.

Hereinafter, operations of asymmetry CDA engine 1 according to various embodiments of the present invention will be discussed.

In a 4-cylinder operating mode, the first, the third, the fourth, the second cylinder 10, 30, 40 and 20 are operated, and the phase differences between the first cranking journal 51 and the third cranking journal 53, between the third cranking journal 53 and the fourth cranking journal 54, between the fourth cranking journal 54 and the second cranking journal 52 and between the second cranking journal 52 and the first cranking journal 51 are about 270 degrees, about 180 degrees, about 90 degrees and about 180 degrees respectively.

According to vehicle operation state, the controller 80 may control the fourth cylinder 40 to be deactivated. In a 3-cylinder operating mode where the fourth cylinder 40 is deactivated, the phase differences between the first cranking journal 51 and the third cranking journal 53, between the third cranking journal 53 and the second cranking journal 52 and between the second cranking journal 52 and the first cranking journal 51 are about 270 degrees, about 270 degrees and about 180 degrees respectively.

According to vehicle operation state, the controller 80 may control the second cylinder 20 to be deactivated. In a 3-cylinder operating mode where the second cylinder 20 is deactivated, the phase differences between the first cranking journal 51 and the third cranking journal 53, between the third cranking journal 53 and the fourth cranking journal 54, between the fourth cranking journal 54 and the first cranking journal 51 are about 270 degrees, about 180 degrees and about 270 degrees respectively.

As described above, the 3-cylinder operating mode may be performed by deactivating the fourth cylinder 40 or the second cylinder 20. Also, the asymmetry CDA engine 1 according to various embodiments of the present invention may operate the fourth cylinder 40 and the second cylinder 20 by turns so that over-cooled may be prevented and operation range and operation time of the 3-cylinder operating mode may be increased.

The asymmetry CDA engine 1 according to various embodiments of the present invention may deactivate the first cylinder 10 or the third cylinder 30.

When the first cylinder 10 is deactivated, the phase differences between the third cranking journal 53 and the fourth cranking journal 54, between the fourth cranking journal 54 and the second cranking journal 52 and between the second cranking journal 52 and the third cranking journal 53 are about 180 degrees, about 90 degrees and about 450 degrees respectively. In this case, since timing imbalance is increase, thus deviation of fuel injection amount needs to be increased.

When the third cylinder 30 is deactivated, the phase differences between the first cranking journal 51 and the fourth cranking journal 54, between the fourth cranking journal 54 and the second cranking journal 52 and between the second cranking journal 52 and the first cranking journal 51 are about 450 degrees, about 90 degrees and about 180 degrees respectively. In this case, since timing imbalance is increased, thus deviation of fuel injection amount needs to be increased.

According to the vehicle operation state, the controller 80 may deactivate the second cylinder 20 and fourth cylinder 40. And in 2-cylinder operating mode where the second cylinder 20 and fourth cylinder 40 are deactivated, the phase differences between the first cranking journal 51 and the third cranking journal 53 and between the third cranking journal 53 and the first cranking journal 51 are about 270 degrees and about 450 degrees respectively.

According to vehicle operation state, the controller 80 may deactivate the third cylinder 30 and fourth cylinder 40. And in 2-cylinder operating mode where the third cylinder 30 and fourth cylinder 40 are deactivated, the phase differences between the first cranking journal 51 and the second cranking journal 52 and between the second cranking journal 52 and the first cranking journal 51 are about 540 degrees and about 180 degrees respectively.

The asymmetry CDA engine 1 according to various embodiments of the present invention may select activated cylinders or deactivated cylinders variously according to operation states of a vehicle, and may reduce deterioration of vibration characteristics by controlling injection amount according to the phase differences between the cranking journals.

Figure 7:
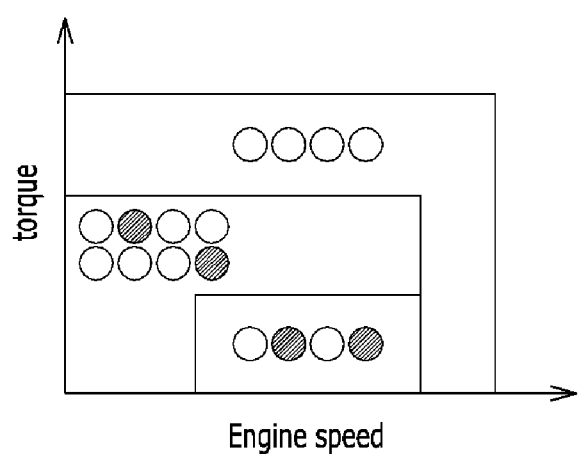
FIG. 7 is a graph showing operation domain of an exemplary asymmetry CDA engine according to the present invention.

FIG. 7 is a graph showing operation domain of an asymmetry CDA engine according to various embodiments of the present invention.

As shown in FIG. 7, the asymmetry CDA engine 1 according to various embodiments of the present invention may perform the 2-cylinder operating mode, the 3-cylinder operating mode and the 4-cylinder operating mode. Thus enhancement of fuel consumption may be realized.

Also, various deactivating mode may be selected, thus operating time of the 2-cylinder operating mode and the 3-cylinder operating mode may be increased.

In the drawing, while the 3-cylinder operating mode where the second cylinder or the fourth cylinder is deactivated, and the 2-cylinder operating mode where the second and the fourth cylinder is deactivated, however, it is not limited thereto, on the contrary, various modification may be realized.

The asymmetry CDA engine 1 according to various embodiments of the present invention may perform various operating modes according to predetermined operating states, and also change operating mode from the 3-cylinder operating mode to 2-cylinder operating mode or the 4-cylinder operating mode, or vice versa. Further, deactivated cylinders may be selected by turns. Thus over-cooled, especially, partial over-cooled states may be prevented.

Figure 8:
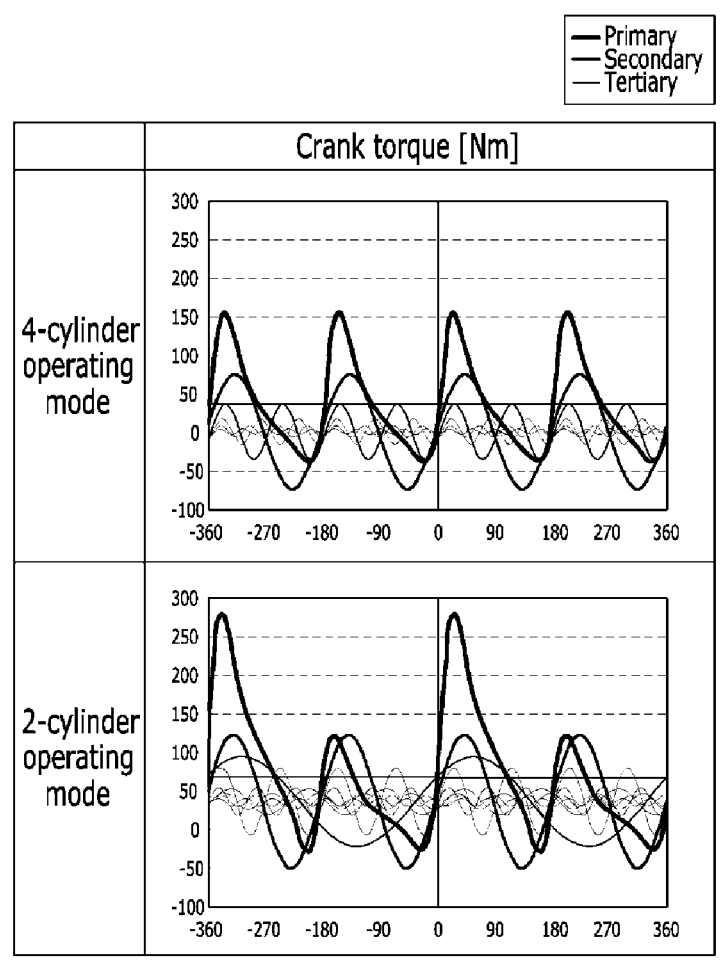
FIG. 8 is graphs illustrating crank torques of a general 4-cylinder engine and an asymmetry CDA engine according to the present invention.
Figure 9:
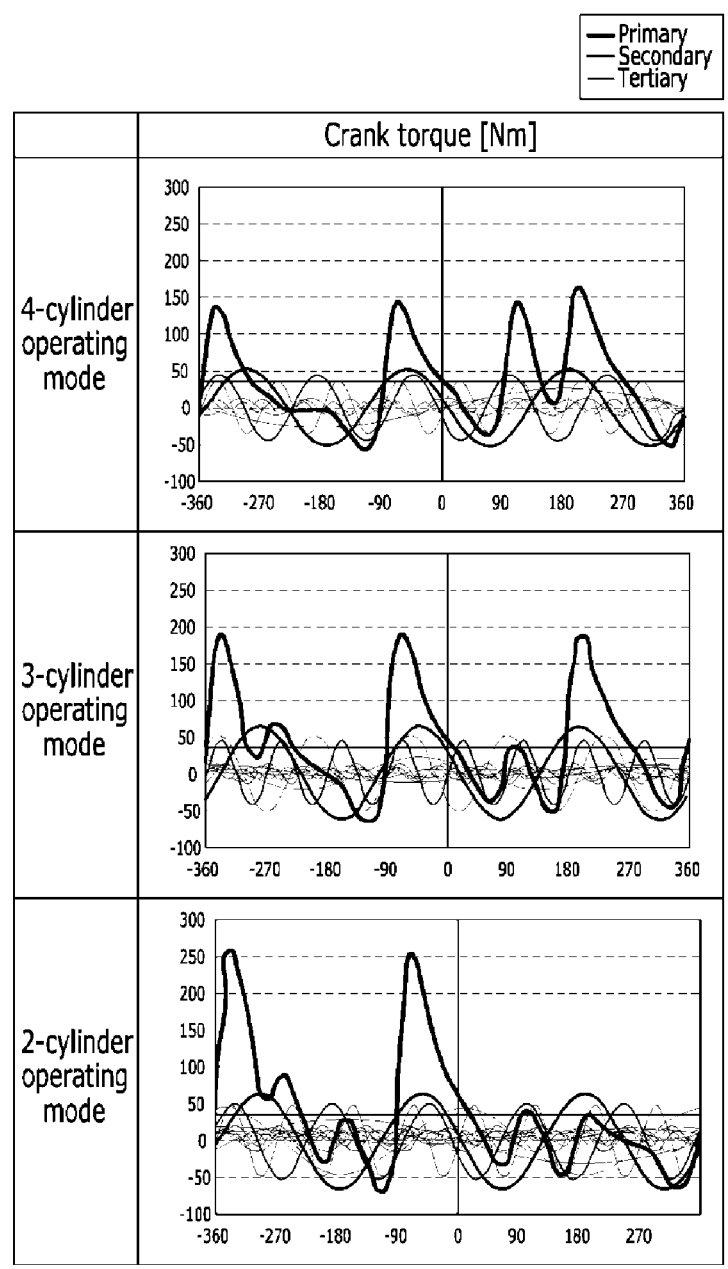
FIG. 9 is graphs illustrating crank torques of a general 4-cylinder engine and an asymmetry CDA engine according to the present invention.

In FIG. 8, crank torque characteristics of a general engine with a general CDA apparatuses in a 4-cylinder operating mode and a 2-cylinder operating mode are shown. And in FIG. 9, crank torque characteristics of the asymmetry CDA engine 1 according to various embodiments of the present invention in the various operating modes are shown.

In the drawing, even though primary torque period in the 4-cylinder operating mode and the 2-cylinder operating mode of the asymmetry CDA engine 1 according to various embodiments of the present invention are irregular, however amplitudes of secondary torque and tertiary torque are relatively reduced.

In the 3-cylinder operating mode, vibration characteristics are similar to that of a general 3-cylinder engine.

Figure 4:
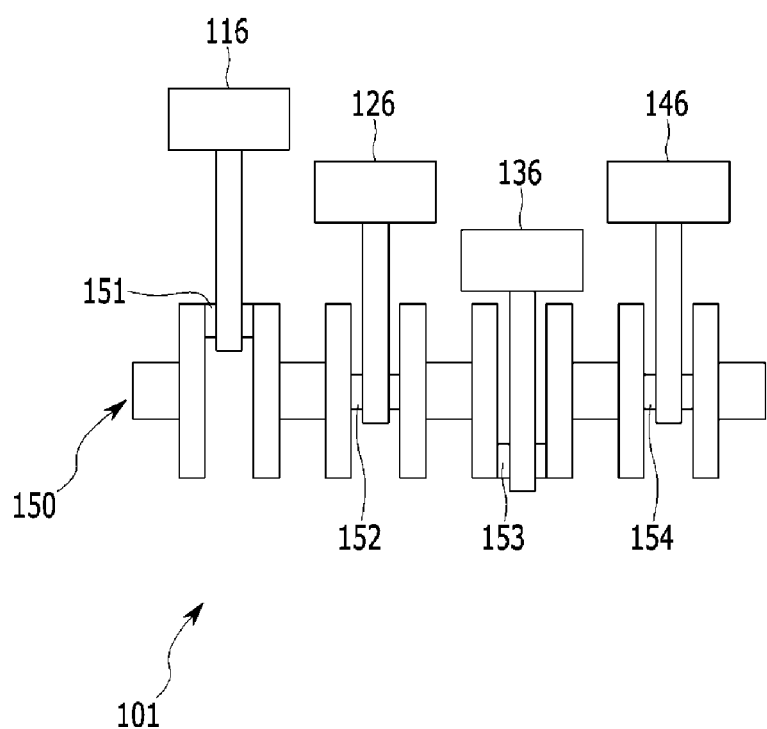
FIG. 4 is a drawing showing an exemplary asymmetry CDA engine according to the present invention.
Figure 5:
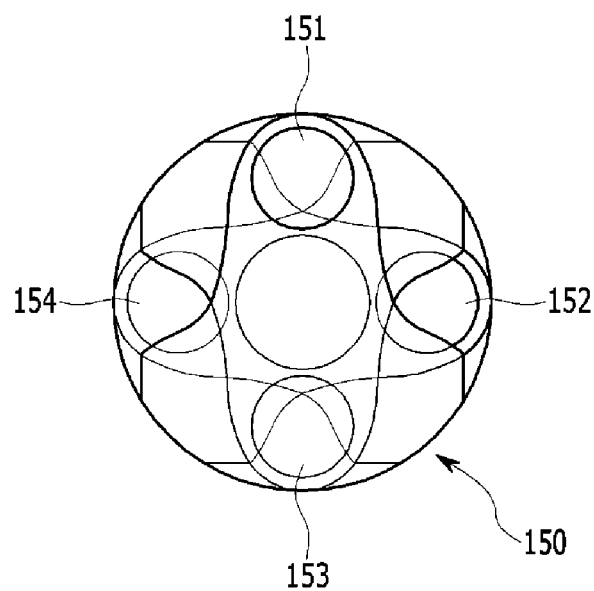
FIG. 5 is a drawing showing a crankshaft applied to an exemplary asymmetry CDA engine according to the present invention.
Figure 6:
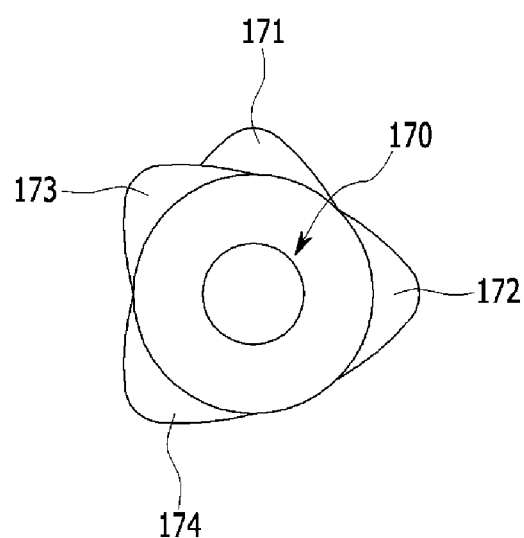
FIG. 6 is a drawing showing a cam applied to an exemplary asymmetry CDA engine according to the present invention.

FIG. 4 is a drawing showing an asymmetry CDA engine according to various embodiments of the present invention, FIG. 5 is a drawing showing a crankshaft applied to an asymmetry CDA engine according to various embodiments of the present invention and FIG. 6 is a drawing showing a cam applied to an asymmetry CDA engine according to various embodiments of the present invention.

Referring to FIG. 4 to FIG. 6, an asymmetry CDA engine 101 according to various embodiments of the present invention may include a first, a second, a third and a fourth cylinder piston 116, 126, 136 and 146 disposed each cylinder respectively, a crankshaft 150 connected with the first, the second, the third and the fourth cylinder piston 116, 126, 136 and 146 through a first, a second, a third and a fourth cranking journal 151, 152, 153 and 154 respectively. And phase differences between the first cranking journal 151 and the third cranking journal 153, between the third cranking journal 153 and the fourth cranking journal 154, between the fourth cranking journal 154 and the second cranking journal 152 and between the second cranking journal 152 and the first cranking journal 151 are 180±10 degrees, 270±10 degrees, 180±10 degrees and 90±10 degrees respectively.

Since a 4-cylinder operating mode, a 3-cylinder operating mode and a 2-cylinder operating mode are the same or similar to that of the asymmetry CDA engine 1 shown in FIG. 1 to FIG. 3 except for the phase differences of cranking journals, a repeated description will be omitted.

In the drawings, CDA operations of the 4-cylinder engine are described, however it is not limited thereto, on the contrary, the asymmetry CDA engine according to various embodiments of the present invention may be applied to other type engines.

That is, the asymmetry CDA engine according to various embodiments of the present invention may include a crankshaft connected with pistons through cranking journals and a controller controlling operations of CDA apparatuses, and a minimum phase difference between cranking journals according to firing order is less than ½ of a maximum phase difference between cranking journals.

For example, if the engine is a 5-cylinder engine, a minimum phase difference between neighboring cranking journals may be about 72 degrees and a maximum phase difference neighboring cranking journals may be about 216. And if the engine is a 6-cylinder engine, a minimum phase difference between neighboring cranking journals may be about 60 degrees and a maximum phase difference neighboring cranking journals may be about 180 degrees.

The controller may operate at least one CDA apparatus according to load of the engine, and operate at least one CDA apparatus and at least one of the other CDA apparatuses by turns according to load of the engine. Also, the controller may operate one CDA apparatus and operate other CDA apparatus additionally according to load of the engine.

The controller may control fuel injection amount into a cylinder of which the CDA apparatus is not operated in accordance with a predetermined map when one or more CDA apparatuses are operated, and phase differences of each cam may be asymmetry.

The engine may be provided with a turbocharger, and injectors directly injecting fuel into each cylinder may be provided to the engine.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An asymmetry cylinder de-activation (CDA) engine provided with a first, a second, a third and a fourth cylinder of which CDA apparatuses are mounted thereto respectively, the asymmetry CDA engine comprising:
   a crankshaft connected with pistons of each cylinder through a first, a second, a third and a fourth cranking journal respectively, the first, the second, the third and the fourth cranking journal being positioned in series along the crankshaft; and
   a controller configured to control operations of the CDA apparatuses,
   wherein phase differences between cranking journals according to firing order include 90±10 degrees and 270±10 degrees,
   wherein the firing order of the engine is the first, the third, the fourth and the second cylinder sequentially, and
   wherein the phase differences between the first cranking journal and the third cranking journal, between the third cranking journal and the fourth cranking journal, between the fourth cranking journal and the second cranking journal and between the second cranking journal and the first cranking journal are 180±10 degrees, 270±10 degrees, 180±10 degrees and 90±10 degrees.

2. The asymmetry CDA engine of claim 1, wherein the controller is configured to operate at least one CDA apparatus according to a load of the engine.

3. The asymmetry CDA engine of claim 1, wherein the controller is configured to operate at least one CDA apparatus and at least one of remaining CDA apparatuses by turns according to a load of the engine.

4. The asymmetry CDA engine of claim 1, wherein the controller is configured to operate two CDA apparatuses by turns according to a load of the engine.

5. The asymmetry CDA engine of claim 1, wherein the controller is configured to operate one CDA apparatus and operates remaining CDA apparatuses additionally according to a load of the engine.

6. The asymmetry CDA engine of claim 1, wherein the controller is configured to control a fuel injection amount into a cylinder of which the CDA apparatus is not operated in accordance with a predetermined map when one or more CDA apparatuses are operated.

7. The asymmetry CDA engine of claim 1, wherein phase differences of each cam are asymmetrical.

8. The asymmetry CDA engine of claim 1, wherein the engine is provided with a turbocharger.

9. The asymmetry CDA engine of claim 1, wherein the engine further comprises an injector which directly injects fuel into each cylinder.

10. An asymmetry CDA engine provided with a plurality of CDA apparatuses, the asymmetry CDA engine comprising:
   a crankshaft connected with pistons of each cylinder through cranking journals respectively; and
   a controller configured to control operations of the CDA apparatuses,
   wherein a minimum phase difference between cranking journals according to firing order is less than ½ of a maximum phase difference between cranking journals,
   wherein a firing order of the engine is the first, the third, the fourth and the second cylinder sequentially, wherein the cranking journals include a first cranking journal coupled to the first cylinder, a second cranking journal coupled to the second cylinder, a third cranking journal coupled to the third cylinder, and a fourth cranking journal coupled to the fourth cylinder, the first to fourth cranking journals being positioned in series along the crankshaft, and wherein the phase differences between the first cranking journal and the third cranking journal, between the third cranking journal and the fourth cranking journal, between the fourth cranking journal and the second cranking journal and between the second cranking journal and the first cranking journal are 180±10 degrees, 270±10 degrees, 180±10 degrees and 90±10 degrees.

11. The asymmetry CDA engine of claim 10, wherein the controller is configured to operate at least one CDA apparatus according to load of the engine, and the controller is configured to operate remaining CDA apparatuses according to a predetermined operation condition.

12. The asymmetry CDA engine of claim 10, wherein the controller is configured to operate at least one CDA apparatus and at least one of remaining CDA apparatuses by turns according to a load of the engine.

13. The asymmetry CDA engine of claim 10, wherein the controller is configured to control a fuel injection amount into a cylinder of which the CDA apparatus is not operated in accordance with a predetermined map when one or more CDA apparatuses are operated.

14. The asymmetry CDA engine of claim 10, wherein phase differences of each cam are asymmetrical.

15. The asymmetry CDA engine of claim 10, wherein the engine is provided with a turbocharger.

16. The asymmetry CDA engine of claim 10, wherein the engine further comprises an injector which directly injects fuel into each cylinder.

* * * * *